United States Patent
Chew (10) Patent No.: US 8,654,643 B2
(45) Date of Patent: Feb. 18, 2014

(54) WIDE FIELD INDEXING FOR PACKET TRACKING

(75) Inventor: Earl Chew, Vancouver (CA)

(73) Assignee: Ixia, Calabasas, CA (US)

( * ) Notice: Subject to any disclaimer, the term of this patent is extended or adjusted under 35 U.S.C. 154(b) by 134 days.

(21) Appl. No.: 13/192,038

(22) Filed: Jul. 27, 2011

(65) Prior Publication Data

US 2013/0028105 A1    Jan. 31, 2013

(51) Int. Cl.
*G01R 31/08* (2006.01)

(52) U.S. Cl.
USPC ...................................... 370/235; 370/395.32

(58) Field of Classification Search
USPC ................. 370/241, 241.1, 248, 389, 395.31, 370/395.32, 252, 235, 392; 709/231; 711/216; 707/747
See application file for complete search history.

(56) References Cited

U.S. PATENT DOCUMENTS

| | | | |
|---|---|---|---|
| 6,233,256 B1 | 5/2001 | Dieterich et al. | |
| 6,389,532 B1 | 5/2002 | Gupta et al. | |
| 6,717,917 B1 | 4/2004 | Weissberger et al. | |
| 6,954,463 B1 | 10/2005 | Ma et al. | |
| 7,111,162 B1 | 9/2006 | Bagepalli et al. | |
| 7,149,230 B2 | 12/2006 | Coffin, III et al. | |
| 7,519,990 B1 | 4/2009 | Xie | |
| 7,643,431 B2 | 1/2010 | Pepper | |
| 7,809,128 B2 | 10/2010 | Li et al. | |
| 2004/0215803 A1* | 10/2004 | Yamada et al. | 709/231 |
| 2005/0152354 A1* | 7/2005 | Abel et al. | 370/389 |
| 2006/0077963 A1 | 4/2006 | Li et al. | |
| 2006/0088060 A1 | 4/2006 | Fujikami et al. | |
| 2006/0190594 A1 | 8/2006 | Jorgenson et al. | |
| 2007/0115833 A1 | 5/2007 | Pepper et al. | |
| 2007/0156869 A1 | 7/2007 | Galchev et al. | |
| 2007/0291654 A1 | 12/2007 | Pepper | |
| 2008/0117907 A1 | 5/2008 | Hein | |
| 2009/0310491 A1* | 12/2009 | Ginsberg et al. | 370/241 |
| 2010/0023726 A1* | 1/2010 | Aviles | 711/216 |
| 2010/0034100 A1 | 2/2010 | Beyers | |
| 2010/0097931 A1* | 4/2010 | Mustafa | 370/235 |
| 2010/0226373 A1* | 9/2010 | Rowell et al. | 370/395.31 |
| 2010/0293280 A1 | 11/2010 | Namihira | |
| 2011/0225168 A1* | 9/2011 | Burroughs et al. | 707/747 |
| 2012/0257628 A1* | 10/2012 | Bu et al. | 370/392 |

FOREIGN PATENT DOCUMENTS

WO    01/01272 A2    1/2001

OTHER PUBLICATIONS

European Patent Office, European Search Report and Written Opinion for European Application 12004952.3-1853, mail date Sep. 26, 2013, 6 total pages.

* cited by examiner

*Primary Examiner* — Anh-Vu Ly
*Assistant Examiner* — Gustavo Lopez-Vargas
(74) *Attorney, Agent, or Firm* — SoCal IP Law Group LLP; John E. Gunther; Steven C. Sereboff (57) ABSTRACT

Methods, apparatus, and computer readable storage media for accumulating traffic statistics. A traffic receiver may receive a packet and determine a flow identifier associated with the received packet. A hash function may be applied to the flow identifier to generate a memory pointer. One or more records may be retrieved from a statistics memory based on the memory pointer. A determination may be made if the flow identifier associated with the received packet matches a flow identifier value contained in one of the one or more retrieved records. When a match occurs, the retrieved record containing the matching flow identifier value may be updated and the updated record may be stored in the statistics memory.

21 Claims, 5 Drawing Sheets

WIDE FIELD INDEXING FOR PACKET TRACKING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be a source of test traffic, a destination for test traffic, or both a source of and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "logic circuit" means a collection of hardware, which may be augmented by firmware and/or software, which performs a described function or set of functions. The term "logic circuit" encompasses combinatorial logic and sequential logic such as, for example, state machines. All or portions of a "logic circuit" may be implemented by a micro-controller or other processor. Logic circuits may typically be designed using a hardware description language (HDL) that defines the logic circuits primarily in functional terms. The HDL design may be verified using an HDL simulation tool. The verified HDL design may then be converted into a gate netlist or other physical description of the logic circuits in a process commonly termed "synthesis". The synthesis may be performed automatically using a synthesis tool. The gate netlist or other physical description may be converted into process instructions and masks for fabricating the engine within an application specific integrated circuit (ASIC).

A gate netlist or other physical description of logic circuits may be further converted into configuration data for implementing the logic circuits in a field programmable gate array (FPGA), a programmable logic device (PLD), or a programmable logic arrays (PLA), or other programmable semiconductor device, all of which will be referred to herein as "programmable circuit devices". Configuration data for programming a programmable circuit device may be stored in a memory or a machine readable storage medium and used to configure a programmable circuit device upon power-up of a test system. In this patent, the term "machine readable storage medium" means a non-volatile medium for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" is not intended to encompass transitory media such as signals and waveforms that may convey digital data.

Within this description, a hardware "unit" also means a collection of hardware, which may be augmented by firmware and/or software, which may be on a larger scale or have a more focused function than a "logic circuit". The terms "logic circuit" and "unit" do not imply any physical separation or demarcation. All or portions of one or more logic circuits and/or units may be collocated on a common card, such as a network card or within a common programmable device, ASIC, or other circuit device.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
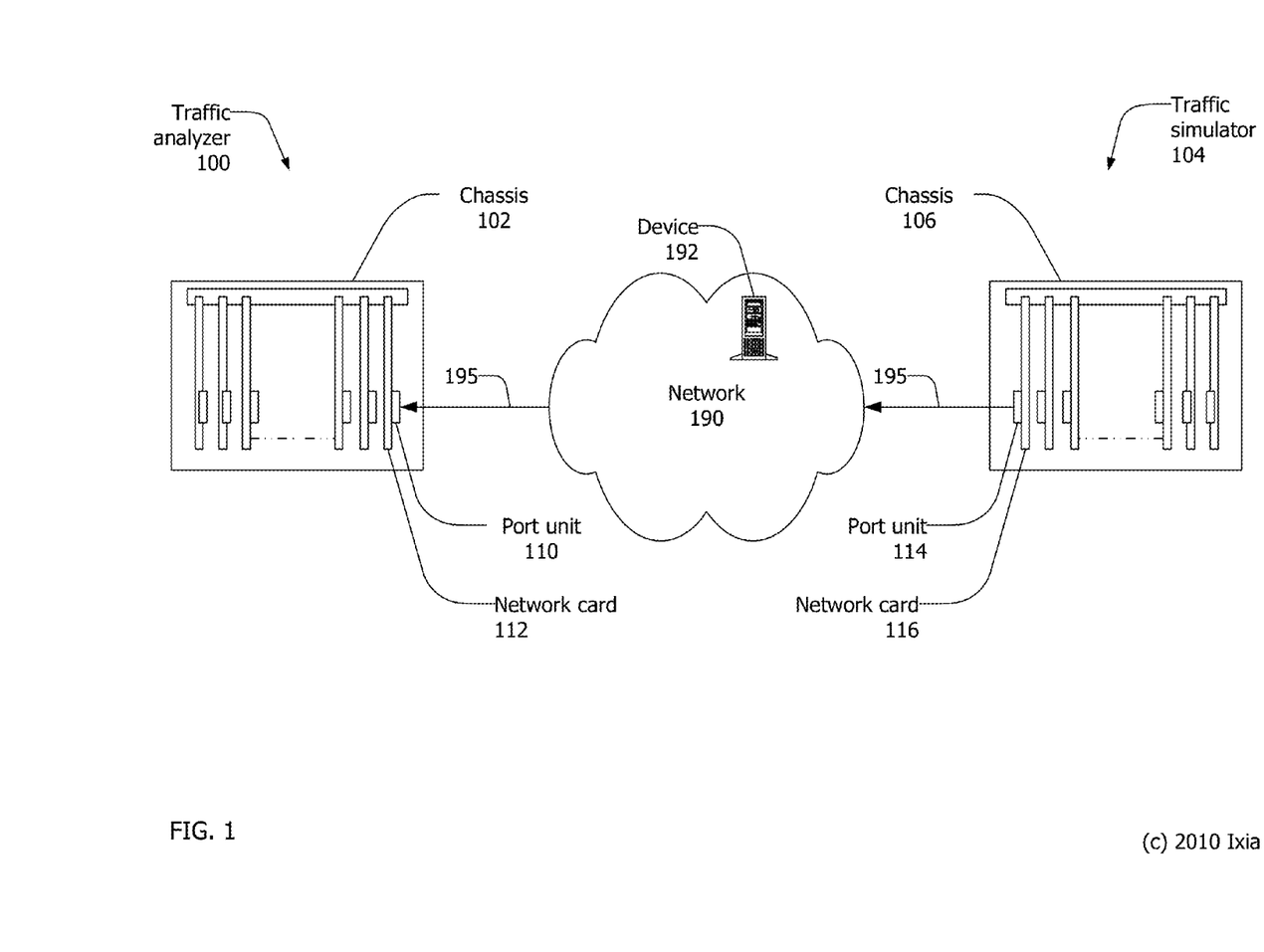
FIG. 1 is a block diagram of a network environment.

FIG. 1 shows a block diagram of a network testing environment. The network testing environment may include a network traffic analyzer 100, a network traffic simulator 104, and a network 190 including one or more network devices 192. The network traffic simulator 104 may generate test traffic that is received by the network traffic analyzer 100 via the network 190 and/or network devices 192 under test. The network traffic analyzer 100 and the network traffic simulator 104 may be separate physical units, as shown, or may be combined in a single unit the both generates and receives test traffic.

The network traffic analyzer 100 may be a network testing device, performance analyzer, conformance validation system, network analyzer, or network management system. The network traffic analyzer 100 may be a portion of the network 190 or a device within the network 190 performing self-testing. The network traffic analyzer 100 may include one or more network cards 112 enclosed within a chassis 102. The chassis 102 may be a fixed or portable chassis, cabinet, or enclosure suitable to contain the network test equipment. The network traffic analyzer 100 may be an integrated unit, as shown in FIG. 1. Alternatively, the network traffic analyzer 100 may comprise a number of separate units cooperative to provide traffic generation and/or analysis.

The network traffic simulator 104 may be a network testing device, performance analyzer, conformance validation system, network analyzer, or network management system. The network traffic simulator 104 may be a portion of the network 190 or a device within the network 190 performing self-testing. The network traffic simulator 104 may include one or more network cards 116 enclosed within a chassis 106. The chassis 106 may be a fixed or portable chassis, cabinet, or enclosure suitable to contain the network test equipment. The network traffic simulator 104 may be an integrated unit, as shown in FIG. 1. Alternatively, the network traffic simulator 104 may comprise a number of separate units cooperative to provide traffic generation and/or analysis. The network cards 112/116 may be permanently installed in the network traffic analyzer 100 and network traffic simulator 104 or may be removable.

The network cards 112/116 may include one or more field programmable gate arrays (FPGAs), application specific integrated circuits (ASICs), programmable logic devices (PLDs), programmable logic arrays (PLAs), processors, and other kinds of programmable circuit devices. In addition, the network cards 112/116 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 112/116 may contain one or more port unit 110/114. Each port unit 110/114 may connect to the network 190 through one or more ports. Each port unit 110/114 may be connected to the network 190 through a communication medium 195, which may be a wire, an optical fiber, a wireless link, or other communication medium. Each network card 112/116 may support a single communications protocol, may support a number of related protocols, or may support a number of unrelated protocols.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network traffic analyzer 100 and the network devices 192 may communicate simultaneously with one another, and there may be plural logical communications paths between the network traffic analyzer 100 and a given network device 192. The network itself may be comprised of numerous nodes providing numerous physical and logical paths for data to travel.

Figure 2:
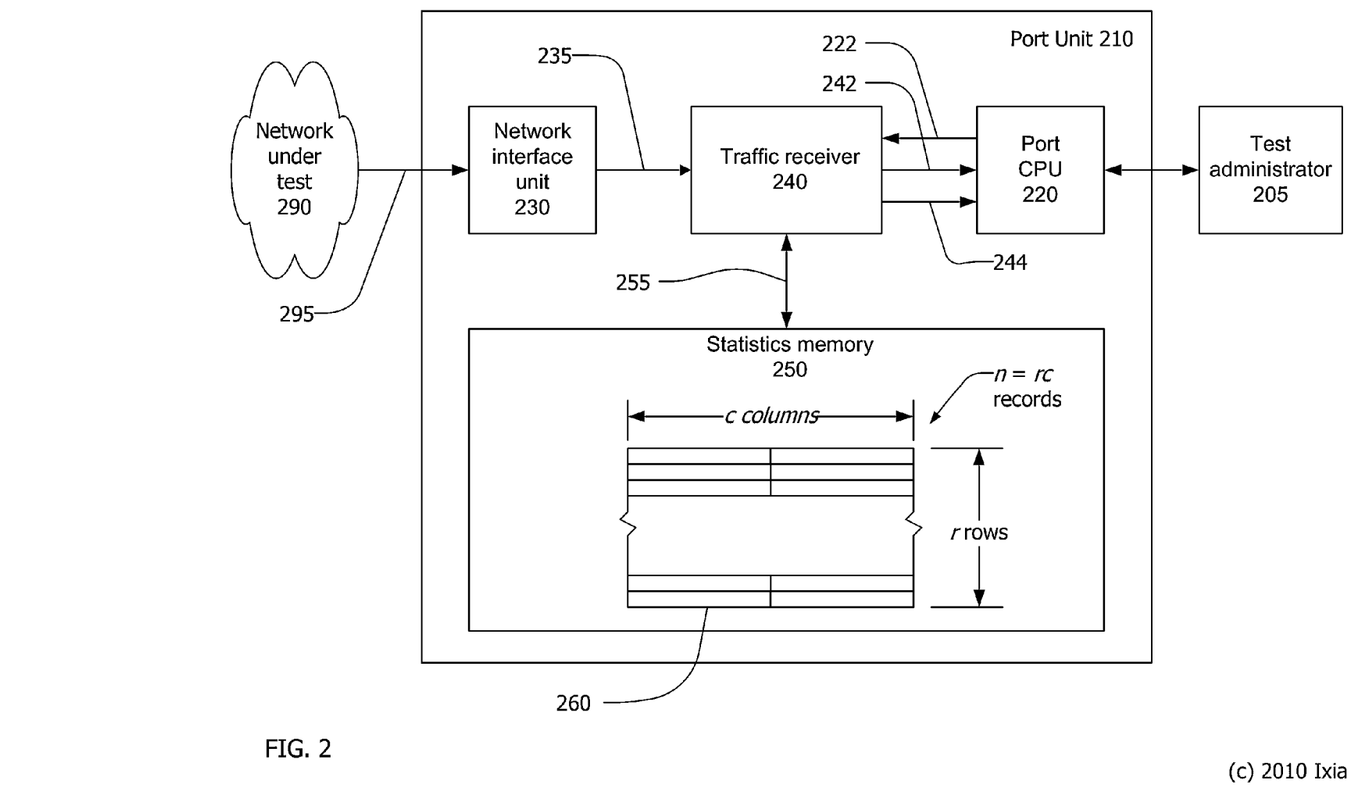
FIG. 2 is a block diagram of a port unit.

Referring now to FIG. 2, an exemplary port unit 210 may include a port central processing unit (CPU) 220, a traffic receiver 240 coupled to a traffic statistics memory 255, and a network interface unit 230 which couples the port unit 210 to a network 290. The port unit 210 may be all or part of a network card for use in a traffic analyzer, such as the network cards 112 in the network traffic analyzer 100. A port unit may also contain a traffic generator, not shown in FIG. 2.

The port CPU 220 may include one or more processors, a memory coupled to the processors, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 220 may communicate with a test administrator 205. The test administrator 205 may be a computing device contained within, or external to, the network traffic analyzer 100. The test administrator 205 may provide the port CPU 220 with instructions and data required for the port unit to participate in testing the network 290. The instructions and data received from the test administrator 205 may include, for example, definitions of traffic statistics that may be accumulated and reported by the port unit 210.

The network interface unit 230 may receive electrical, optical, or wireless signals from the network 290 over the link 295 and may convert the received signals into incoming test traffic 235 in a format usable to the traffic receiver 240.

The traffic receiver 240 may receive the incoming test traffic 235 from the network interface unit 230. The traffic receiver 240 may include logic circuits to determine if each received packet is a member of a specific flow, and to accumulate traffic statistics for each flow in accordance with test instructions 222 provided by the port CPU 220.

Accumulated traffic statistics 255 may be stored in the statistics memory 250. The statistics memory 250 may store n records such as the record 260, where n is a positive integer. The number of records n may be a large binary number such as 65,536 ($2^{16}$) or 262,144 ($2^{18}$). The number of records n is not limited to a binary number. Each of the n records may contain the traffic statistics for a corresponding flow. Each of the n records may contain traffic statistics including quantitative information such as a number of packets received and a number of packets received out-of-order, temporal information such as maximum and minimum latency times, and other information. The records stored in the statistics memory 250 may be logically organized as a table having c columns and r rows of records, where c and r are positive integers such that cr=n.

The traffic receiver 240 may also include logic circuits to capture and store selected packets in accordance with capture criteria included in the test instructions 222. The traffic receiver 240 may provide traffic statistics 242 and/or captured packets 244 to the port CPU 220, in accordance with the test instructions 222, for additional analysis during, or subsequent to, the test session.

The port unit 210 may accumulate traffic statistics for a plurality of flows. For example, each flow may be identified by a packet group identification number (PGID) embedded within a payload portion of each received packet, as described in U.S. Pat. No. 6,717,917, entitled "METHOD OF DETERMINING REAL-TIME DATA LATENCY AND APPARATUS THEREFOR". However, in some circumstances, the incoming test traffic 235 may not contain PGIDs within each packet. For example, a traffic analyzer may be used to analyze actual network traffic rather than test traffic generated by a traffic simulator, or a traffic analyzer may be used to analyze test traffic generated by a traffic simulator that does not have the capability of embedding PGIDs in each packet. In situations where received packets do not contain embedded PGIDs, packet flows may be identified by data extracted from other fields in the received packets.

Figure 3:
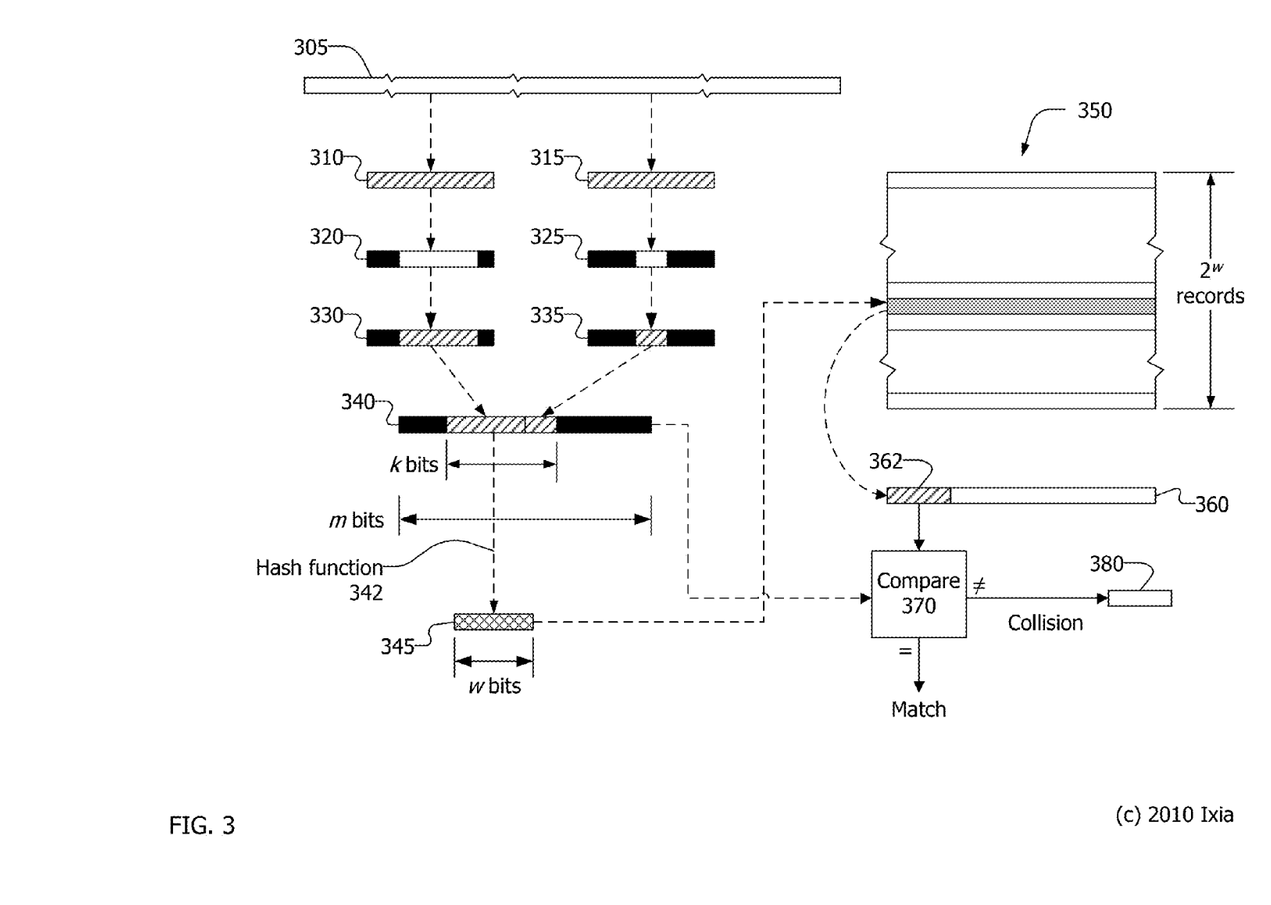
FIG. 3 is a graphical representation of accessing a flow statistics memory.

FIG. 3 shows a graphical representation of determining a flow identifier for a received packet and accessing the corresponding traffic statistics in a statistics memory. The statistics memory 350 may store $n=2^2$ records organized as a single column of records. The statistics memory 350 may be the statistics memory 250 of FIG. 2 with c=1. Each of the $2^w$ records may be accessed using a corresponding w-bit address pointer.

A received packet 305 may have a header portion divided into a plurality of fields including some or all of source and destination media access (MAC) addresses, source and destination internet protocol (IP) addresses, source and destination transmission control protocol (TCP) port numbers, a sequence number, a quality of service (QOS) field, and one or more checksums. The received packet 305 may also include a payload portion. When the received packet 305 does not contain a PGID embedded in the payload portion, data from one or more fields may be extracted and combined to generate a flow identifier that associates the received packet 305 with a particular flow and with a corresponding record in the statistics memory 350. U.S. Pat. No. 7,643,431, entitled "DISTRIBUTED PACKET GROUP IDENTIFICATION FOR NETWORK TESTING", describes developing a packet group identifier by combining multiple fields extracted from a received packet.

In the example of FIG. 3, two fields 310, 315 may be extracted from the received packet. The extracted fields may typically be header fields such as MAC or IP addresses, TCP port numbers, QOS, or other fields. More than two fields may be extracted and combined to form a flow identifier. Masks 320, 325 may be applied to the extracted fields 310, 315, respectively. For example, the shaded portions of the masks 320, 325 may represent bits set to "0" and the unshaded portions may represent bits set to "1". The extracted fields 310, 315 and the respective masks 320, 325 may be combined by an AND function to produce masked data fields 330, 335. In the masked data fields 330, 335, the masked bits (shown shaded) may set to zero, and the unmasked bits (shown with single hatching) may be equal to the corresponding bits of the extracted fields 310, 315.

The masked data fields 330, 335 may then be combined to form a flow identifier 340. The unmasked bits (shown with single hatching) may be shifted such that all unmasked bits are contiguous within the flow identifier 340. The resulting flow identifier 340 may contain m bits, where m is the sum of the bit lengths of the extracted fields 310 and 315, including k contiguous unmasked bits. The k contiguous unmasked bits may be located anywhere within the flow identifier 340. In the case where k≤w, the k unmasked bits may simply be used as the address pointer to access a corresponding row of the statistics memory 350. However, if k>w, the k unmasked bits cannot be used directly as the address pointer to access the statistics memory 350, since some possible values of the k unmasked bits will point to rows that do not exist within the statistics memory.

When k>w, the k unmasked bits of the flow identifier 340 may be mapped to a w-bit address pointer value using a hash function. A hash function is any algorithm or mathematical function that converts a larger amount of data into a smaller amount of data, typically a single integer. The value returned by a hash function is called hash value. For example, an order-w CRC (cyclic redundancy check) polynomial may be used to generate a w bit hash value 345 for use as the address pointer to access the statistics memory 350. A CRC polynomial has the desirable property that the mapping from the flow identifier 340 to the hash value 345 is unique when k≤w. This may not necessarily be true of other hash functions.

When k>w, multiple possible values of the k unmasked bits of the flow identifier may map to the same value of the w-bit hash value 345. Thus there is a possibility that traffic statistics for two or more flows may be erroneously combined in a single record within the statistics memory 350. To avoid accumulation of erroneous flow statistics, each record in the statistics memory 350 may include a field containing the flow identifier of the corresponding flow.

When the packet 305 is received by the traffic receiver 240, dedicated logic circuits or a combination of software and hardware may generate the flow identifier 340. A hash function 342 may then be applied to map the flow identifier 340 to the hash value 345. The hash value 345 may then be used to retrieve a record 360 from the statistics memory 350. The retrieved record 360 may include a field 362 containing a flow identifier value corresponding to the traffic statistics stored in the retrieved record. A comparator 370 may then compare the generated flow identifier 340 and the retrieved flow identifier field 362. If the two values are equal, the packet 305 belongs to the flow corresponding to the traffic statistics stored in the retrieved record 360. In this case, the retrieved record 360 may be updated to reflect the receipt of the packet 305. The updated record may be stored back in the statistics memory 350.

If the comparator 370 indicates that the two flow identifier values are not equal, the packet 305 does not belong to the flow corresponding to the traffic statistics stored in the retrieved record, but rather belongs to a different flow that maps to the same hash value. This situation may be referred to as a "collision", since a second flow has "collided" with the flow whose traffic statistics were already stored in the statistics memory 350. In this case, the traffic statistics contained in the retrieved record 360 may not be updated, and the packet 305 may be discarded. A packet receiver may maintain a count 380 indicating the number of collisions that have occurred. This count may be incremented each time a collision occurs. Although not shown in FIG. 3, a count of collisions may be maintained for each record. In this case, a field (not shown) within the retrieved record 360 may be incremented when a collision occurs, and the updated record may then be stored back in the statistics memory 350.

A traffic receiver that uses a hash function to map a flow identifier to an address pointer for accessing a traffic statistic memory may not be able to accumulate traffic statistics for all flows due to collisions. Typically, the hash function 342 randomly maps a flow identifier 340 to a hash value 345. In this case, as the number of different received flow identifiers approaches the number of available records in the traffic statistics memory, about 37% of the received flow identifiers will be discarded due to collisions. Thus the traffic receiver may be able to accumulate traffic statistics on only about 63% of the actual flows.

Figure 4:
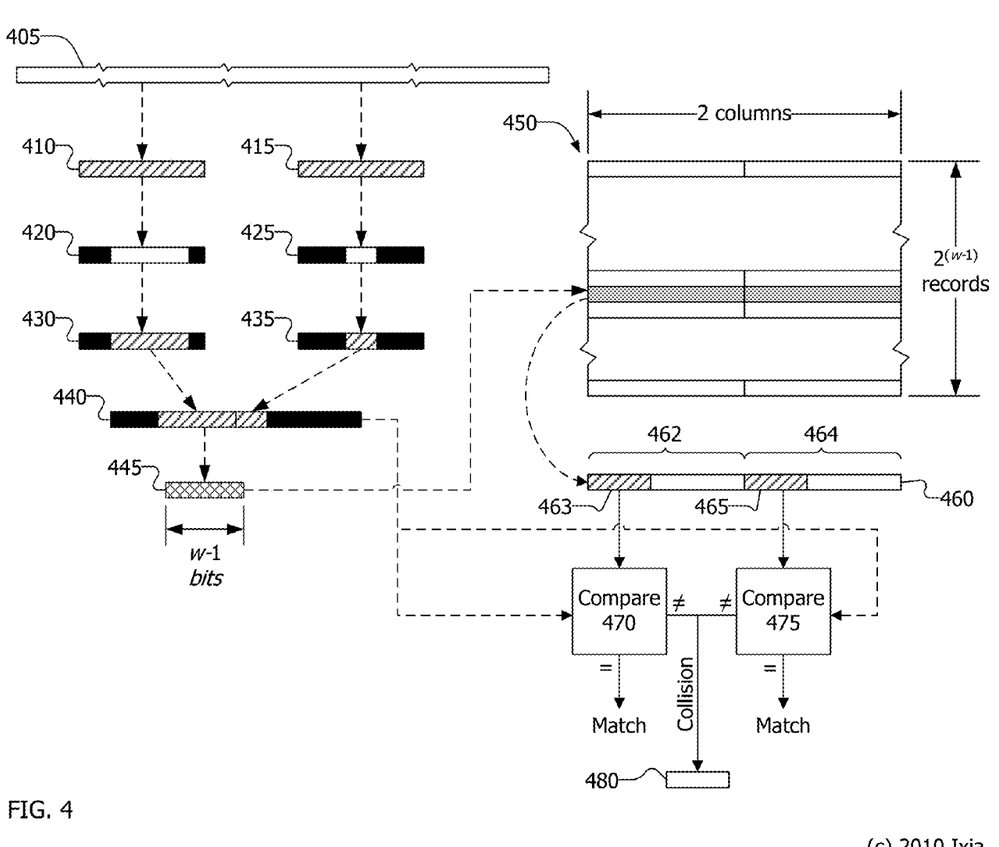
FIG. 4 is a graphical representation of accessing a flow statistics memory.

FIG. 4 shows a graphical representation of determining a flow identifier for a received packet and accessing the corresponding traffic statistics in a statistics memory. The statistics memory 450 may store n=$2^w$ records organized as 2 columns by $2^w/2=2^{w-1}$ rows. The statistics memory 450 may be the statistics memory 250 of FIG. 2 with c=2. Each row of the $2^{w-1}$ records may be accessed using a corresponding w−1 bit address pointer.

As described in conjunction with FIG. 3, fields 410, 415 may be extracted from a received packet 405. Masks 420, 425 may be applied to the extracted fields 410, 415, and the resultant masked fields 430, 435 may be combined to form a flow identifier 440. A hash function, such as a w−1 order CRC polynomial, may be applied to the flow identifier 440 to produce a w−1 bit hash value 445.

When the packet 405 is received by a traffic receiver such as the traffic receiver 240, dedicated logic circuits or a combination of software and hardware may generate the flow identifier 440 and the hash value 445. The hash value 445 may then be used to retrieve a row containing records 462 and 464 from the statistics memory 450. Since two records are retrieved simultaneously, the width in bits of the data path from the statistics memory must be twice as wide as the data path required to read a single-column statistics memory (as shown in FIG. 3). Each retrieved record 462, 464 may include respective fields 463, 465 containing a flow identifier value corresponding to the traffic statistics respectively stored in the retrieved records.

Respective comparators 470, 475 may then compare the generated flow identifier 440 and the retrieved flow identifier fields 463, 465. If the generated flow identifier 440 matches the retrieved flow identifier 463, the packet 405 belongs to the flow corresponding to the traffic statistics stored in the retrieved record 462. In this case, the retrieved record 462 may be updated to reflect the receipt of the packet 405. If the generated flow identifier 440 matches retrieved flow identifier 465, the packet 405 belongs to the flow corresponding to the traffic statistics stored in the retrieved record 464. In this case, the retrieved record 464 may be updated to reflect the receipt of the packet 405. The updated versions of records 462, 464 may be stored back in the statistics memory 450.

If the comparators 470, 475 indicate that the generated flow identifier 440 is not equal to either of the retrieved flow identifiers 463, 465, the packet 405 does not belong to the flow corresponding to the traffic statistics stored in either retrieved record, but may belong to a different flow that maps to the same hash value. This situation may be referred to as a "collision", since a third flow has "collided" with the two flows whose traffic statistics were already stored in the statistics memory 450. In this case, a counter 480, indicating a total number of collisions that have occurred, may be incremented.

A traffic receiver that uses a hash function to map a flow identifier to an address pointer for accessing a traffic statistic memory organized as multiple columns of records may not be able to accumulate traffics statistics for all flows due to collisions. However, the number of collisions may be greatly reduced compared to a traffic statistics memory organized as a single column. In the two-column example of FIG. 4, as the number of different received flow identifiers approaches the number of available records in the traffic statistics memory, only about 27% of the received flow identifiers will be discarded due to collisions. Thus the traffic receiver may be able to accumulate traffic statistics on about 73% of the actual flows. The number of collisions may be further reduced by increasing the number of columns in the statistics memory, at a cost of a proportional increase in the width of the data path from the statistics memory.

Description of Processes

Figure 5:
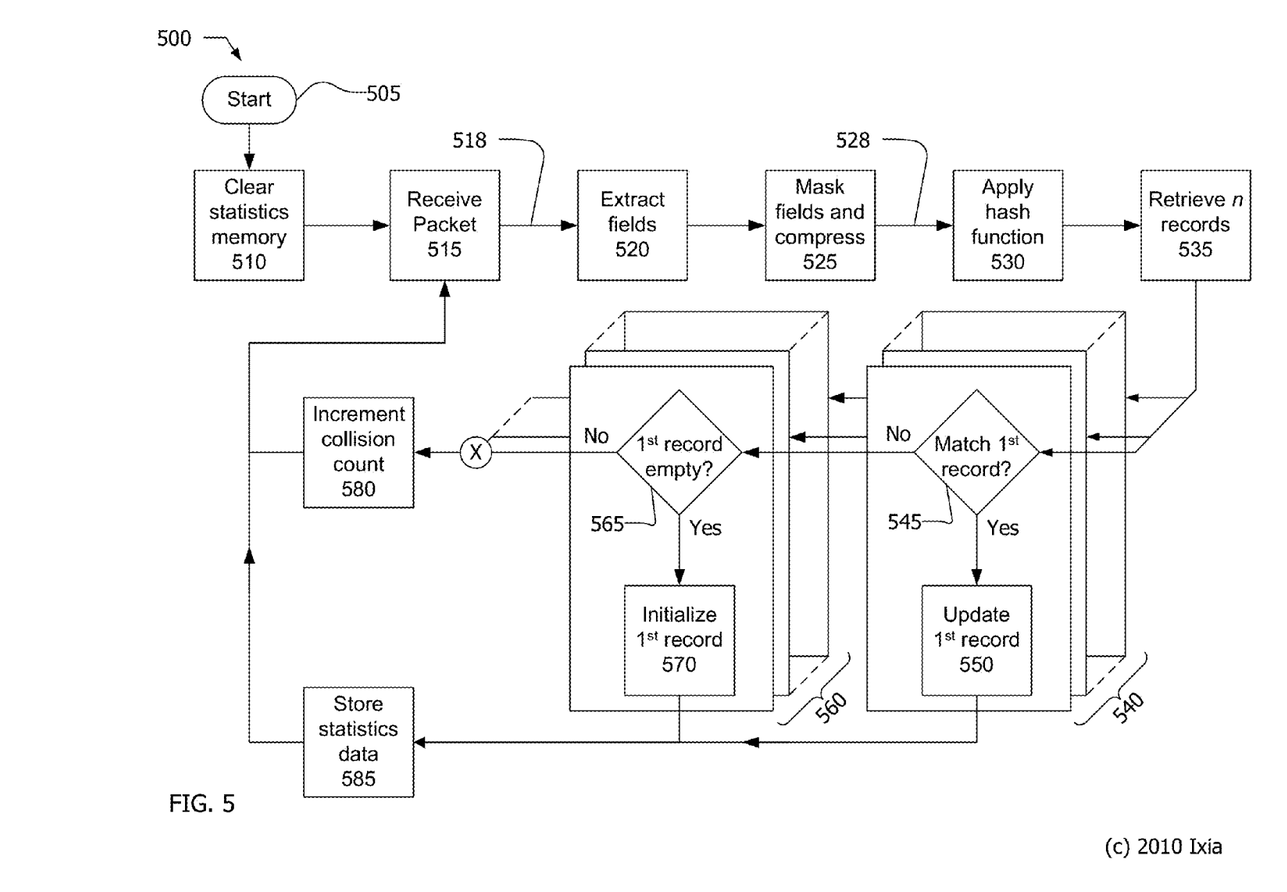
FIG. 5 is a flow chart of a process for receiving packets.

Referring now to FIG. 5, a process 500 for accumulating traffic statistics may begin at 505 when instructions to start accumulating traffic statistics are received at a port unit such as the port unit 210. The process 500 may be cyclic in nature, and the actions from 515 to 585 may be performed repeatedly to accumulate traffics statistics for a large number of received packets. Multiple instances of the process 500 may be performed concurrently at a plurality of port units to accumulate traffic statistics for a network or network device under test.

For ease of discussion, the process 500 is shown in FIG. 5 as a flow chart with sequential actions. However all or portions of the process 500 may be performed in parallel by logic circuits within a traffic receiver. In particular, the actions from 535 to 585 may be performed nearly simultaneously during a single hardware memory cycle. A traffic receiver may perform the actions from 515 to 585, at least in part, as a pipeline such that multiple instances of the process occur simultaneously.

When an instruction to start accumulating traffic statistics is received at 505, a statistics memory, such as the statistics memory 250 of FIG. 2, may be cleared or emptied to indicate that no traffic statistics are currently stored. Alternatively, the statistics memory may be cleared at the conclusion of a previous test session or at some other time in anticipation that a start instruction will be received at 505. A statistics memory may be considered to be cleared or empty when a traffic receiver coupled to the statistics memory can determine whether or not a record contains currently valid statistics data. For example, a "number of received packets" field within each record may be set to zero to empty a statistics memory.

A packet may be received at 515. At 520, one or more predetermined fields may be extracted from the received packet 518. The extracted fields may contain information useful to characterize and report flow statistics information. The extracted fields may include, for example, one or more of source and destination MAC addresses, source and destination IP addresses, source and destination TCP port numbers, a protocol identifier, a quality of service value, flags, and other fields.

At 520, masks may be applied to the fields extracted at 520 and the resultant unmasked bits may be compressed to form a flow identifier 528, as previously described in conjunction with FIG. 3. At 530, a hash function may be applied to the flow identifier 528, and the resulting hash value may be used to retrieve a plurality of records from the statistics memory at 535. As previously described, the statistics memory 250 may be configured as a table having c columns and $2^w/c$ rows, where $2^w$ is the total capacity of the statistics memory in records. At 535, an entire row of the table may be retrieved, such that the number of records retrieved is equal to the number of columns.

At 540, the c records retrieved at 535 may be processed to determine if any one of the retrieved records should be updated based on the received packet 518. At 545, a determination may be made whether or not the flow identifier 528 matches the content of a "flow identifier" field within the first record. When a match is found, the first record may be updated at 550. Updating the first record at 550 may include incrementing a "number of received packets" field within the first record to reflect receipt of the received packet 518. Other fields within the first record may be updated based on the packet received at 515. For example, a latency time of the received packet 518 may be written into a "minimum latency" field or a "maximum latency" field within the first record if appropriate. The updated first record may be stored back into the statistics memory at 585, and the process 500 may return to 515 to await the receipt of another packet.

The actions at 540 may be performed for each of the c records retrieved at 535. As shown in FIG. 5, the actions at 540 may be performed in parallel for each retrieved record, for example using dedicated hardware. Although not shown, the actions at 540 may be performed sequentially for each of the n retrieved records.

When the flow identifier 528 does not match a flow identifier field within any of the c retrieved records, the c records retrieved at 535 may be processed at 560 to determine if one of the retrieved records should be initialized based on the received packet 518. A determination may be made at 565 whether or not the first retrieved record is empty. For example, a determination may be made if a "number of received packets" field within the first record is set to zero. When a determination is made that the first record is empty, the first record may be initialized based on the received packet 518 at 570. Initializing the first record at 570 may include setting the value of a number of received packets field within the first record to one. Initializing the first record at 570 may also include copying the flow identifier 528 to a "flow identifier" field within the first record. Other fields within the first record may be updated based on the received packet 518. For example, a latency time of the received packet 518 may be written into both a "minimum latency" field and a "maximum latency" field within the first record. The initialized first record may be stored back into the statistics memory at 585, and the process 500 may return to 515 to await the receipt of another packet.

The actions at 560 may be performed for each of the c records retrieved at 535. As shown in FIG. 5, the actions at 560 may be performed in parallel for all retrieved record, for example using dedicated hardware. Although not shown, the actions at 560 may be performed sequentially for each of the retrieved records. When two or more retrieved records are empty, priority logic (not shown) may be used to determine which of the empty records is initialized.

When the flow identifier 528 does not match the content of a flow identifier field within any of the retrieved records, and none of the retrieved records is empty, a collision has occurred. In this event, a collision counter may be incremented at 580 and the process 500 may return to 515 to await the receipt of another packet.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method to accumulate traffic statistics, comprising: receiving a packet; determining a flow identifier associated with the received packet; applying a hash function to the flow identifier to generate an address pointer; retrieving one or more records from a statistics memory based on the address pointer, the one or more records being a portion of a total number of records stored in the statistics memory, each of the one or more records containing a respective flow identifier; determining if the flow identifier associated with the received packet matches the flow identifier value contained in one of the one or more retrieved records; when a match occurs updating the retrieved record containing the matching flow identifier value, and storing the updated record in the statistics memory, when the flow identifier associated with the received packet does not match any of the flow identifier values contained in the one or more retrieved records, determining whether or not each of the one or more retrieved records contains valid statistics data; and when one or more retrieved records is identified as not containing valid statistics data, initializing the identified record based on the received packet and storing the initialized record in the statistics memory.

2. The method of claim 1, wherein determining a flow identifier associated with the received packet comprises: extracting one or more fields from the received packet, applying masks to the one or more extracted fields; and combining unmasked bits from the extracted fields to form the flow identifier.

3. The method of claim 1, wherein the statistics memory is configured to store a plurality of records, logically organized as a table with c columns and r rows, where r and c are integers greater than one, and retrieving one or more records comprises retrieving c records from a row identified by the address pointer.

4. The method of claim 3, wherein applying a hash function comprises applying a cyclic redundancy check polynomial to the flow identifier to generate the address pointer.

5. The method of claim 1, wherein initializing the identified record comprises: setting a value for a number of received packets field within the identified record to one; and writing the flow identifier associated with the received packet to a flow identifier field within the identified record.

6. The method of claim 5, wherein initializing the empty record further comprises:
writing a latency time of the received packet to one or more of a minimum latency time field, a maximum latency time field, and an average latency time field within the identified record.

7. The method of claim 1, further comprising: when the flow identifier associated with the received packet does not match any of the flow identifier values contained in the one or more retrieved records and all of the one or more retrieved records contain valid statistics data, incrementing a counter indicating a number of collisions.

8. A traffic receiver, comprising: a statistics memory configured to store a plurality of records; and logic circuits configured to: receive a packet; determine a flow identifier associated with the received packet; apply a hash function to the flow identifier to generate an address pointer; retrieve one or more records from the statistics memory based on the address pointer, the one or more records being a portion of a total number of records store in the statistics memory, each of the one or more records containing a respective flow identifier value; determine if the flow identifier associated with the received packet matches the flow identifier value contained in one of the one or more retrieved records; when a match occurs, update the retrieved record containing the matching flow identifier value and store the updated record in the statistics memory; when the flow identifier associated with the received packet does not match any of the flow identifier values contained in the one or more retrieved records, determining whether or not each of the one or more retrieved records contains valid statistics data; and when one or more retrieved records is identified as not containing valid statistics data, initializing the identified record based on the received packet and storing the initialized record in the statistics memory.

9. The traffic receiver of claim 8, the logic circuits further configured to: extract one or more fields from the received packet; apply predetermined masks to the one or more extracted fields; and combine unmasked bits from the extracted fields to form the flow identifier.

10. The traffic receiver of claim 8, wherein the statistics memory is logically organized as a table with c columns and r rows, where c and r are integers greater than one, and the one or more records retrieved from the statistics memory is c records from a row identified by the address pointer.

11. The traffic receiver of claim 10, the logic circuits further configured to apply a cyclic redundancy check polynomial to the flow identifier to generate the address pointer.

12. The traffic receiver of claim 8, wherein the logic circuits are configured to initialize the identified record by actions including: setting a value of a number of received packets field within the identified record to one, and writing the flow identifier associated with the received packet to a flow identifier field within the identified record.

13. The traffic receiver of claim 12, wherein the logic circuits are configured to initialize the identified record by further actions including:
writing a latency time of the received packet to one or more of a minimum latency time field, a maximum latency time field, and an average latency time field within the identified record.

14. The traffic receiver of claim 8, the logic circuits further configured to: when the flow identifier associated with the received packet does not match any of the flow identifier values contained in the one or more retrieved records and all of the one or more retrieved records contain valid statistics data, incrementing a counter indicating a number of collisions.

15. A machine-readable storage medium storing configuration data that, when used to configure one or more programmable logic devices, causes the programmable logic devices to include logic circuits configured to: receive a packet; determine a flow identifier associated with the received packet; apply a hash function to the flow identifier to generate an address pointer; retrieve one or more records from the statistics memory based on the address pointer, the one or more records being a portion of a total number of records store in the statistics memory, each of the one or more records containing a respective flow identifier value; determine if the flow identifier associated with the received packet matches the flow identifier value contained in one of the one or more retrieved records; when a match occurs, update the retrieved record containing the matching flow identifier value and store the updated record in the statistics memory; when the flow identifier associated with the received packet does not match any of the flow identifier values contained in the one or more retrieved records, determining whether or not each of the one or more retrieved records contains valid statistics data; and when one or more retrieved records is identified as not containing valid statistics data, initializing the identified record based on the received packet and storing the initialized record in the statistics memory.

16. The machine-readable storage medium of claim 15, the logic circuits further configured to: extract one or more fields from the received packet; apply predetermined masks to the one or more extracted fields; and combine unmasked bits from the extracted fields to form the flow identifier.

17. The machine-readable storage medium of claim 15, wherein the statistics memory is logically organized as a table with c columns and r rows, where c and r are integers greater than one, and the one or more records retrieved from the statistics memory are c records from a row identified by the address pointer.

18. The machine-readable storage medium of claim 15, the logic circuits further configured to apply a cyclic redundancy check polynomial to the flow identifier to generate the address pointer.

19. The machine-readable storage medium of claim 15, wherein the logic circuits are configured to initialize the identified record by actions including: setting a value of a number of received packets field within the identified record to one, and writing the flow identifier associated with the received packet to a flow identifier field within the identified record.

20. The machine-readable storage medium of claim 19, wherein the logic circuits are configured to initialize the identified record by further actions including:
   writing a latency time of the received packet to one or more of a minimum latency time field, a maximum latency time field, and an average latency time field within the identified record.

21. The machine-readable storage medium of claim 15, the logic circuits further configured to: when the flow identifier associated with the received packet does not match any of the flow identifier values contained in the one or more retrieved records and all of the one or more retrieved records contain valid statistics data, incrementing a counter indicating a number of collisions.

* * * * *